United States Patent [19]
Barns et al.

[11] Patent Number: 4,526,599
[45] Date of Patent: Jul. 2, 1985

[54] OPTICAL FIBER FABRICATION PROCESS

[75] Inventors: Robert L. Barns, Berkeley Heights; Arthur D. Pearson, Bernardsville, both of N.J.

[73] Assignee: AT&T Bell Laboratories, Murray Hill, N.J.

[21] Appl. No.: 297,213

[22] Filed: Aug. 28, 1981

[51] Int. Cl.³ .............................................. C03B 37/07
[52] U.S. Cl. ....................................... 65/3.12; 65/3.2; 427/163; 427/231; 427/237
[58] Field of Search ................. 65/3.12, 3.2, 157; 427/163, 166, 167, 231, 237, 238; 118/730, 733

[56] References Cited

U.S. PATENT DOCUMENTS

| Re. 28,028 | 6/1974 | Maurer | 65/3.12 |
| 4,140,505 | 2/1979 | Ramsay et al. | 65/3.12 X |
| 4,203,743 | 5/1980 | Suganuma et al. | 427/163 X |
| 4,217,027 | 8/1980 | MacChesney et al. | 65/3.12 X |
| 4,317,667 | 3/1982 | Spainhour | 65/3.12 X |
| 4,347,069 | 8/1982 | Haney et al. | 65/3.12 |
| 4,389,231 | 6/1983 | Partus | 65/3.12 |

Primary Examiner—William Smith
Assistant Examiner—Michael K. Boyer
Attorney, Agent, or Firm—Eugen E. Pacher

[57] ABSTRACT

A method of forming optical fibers with minimal contamination from ambient air is disclosed. In the inventive method a gas stream is introduced into a rotating structure by means of a rotating seal. The rotating seal comprises a rotating member seated within a stationary member. Counterflowing gases are flowed through the clearance region between the rotating and stationary members to prevent seepage of ambient air into the gas stream.

10 Claims, 3 Drawing Figures 4,526,599

OPTICAL FIBER FABRICATION PROCESS

BACKGROUND OF THE INVENTION

1. Field of the Invention

This invention is a method of forming optical fibers. The method includes the transfer of gases, from a gas source to an apparatus which is rotating relative to the gas source, by means of a rotating seal, thereby preventing contamination by ambient air.

2. Disclosures of Interest

Progress over the past decade in the development of fiber fabrication technology has resulted in present day commercial fabrication of optical fibers with losses less than 5 dB/km. Such fabrication technology has been the largest single contributor to the realization of commercially viable optical communication systems. Low loss fibers are generally obtained by forming fibers in which the central region, where most of the optical transmission occurs, comprises extremely pure silica based glasses. Silica has very low loss characteristics in the spectral regions of interest, i.e. from 0.7 to 2 microns, and the high purity of the silica formed in currently available technology ensures the absence of contaminants which would otherwise increase the loss characteristics of the fiber. Dopants, such as germanium and phosphorus, are used to obtain a radially graded index of refraction so as to minimize mode loss in multimode fibers, as well as to obtain appropriate gradation characteristics in other fibers.

In present day technology high purity silica is obtained by starting with relatively pure glass precursor vapors, such as silicon tetrachloride and germanium tetrachloride, which are then reacted with oxygen to obtain appropriate silica based glasses. Such processes are described for example in U.S. Pat. No. Re. 28,028 and U.S. Pat. No. 4,217,027. Clearly, in the prevalent technology, which depends upon the reaction of glass precursor vapors to form glasses, significant care must be taken to ensure that ambient contaminants do not enter the gas transport system, to become ultimately of the optical fiber, adding significantly to its loss characteristics. In some fiber fabrication technologies contamination from ambient gases is avoided relatively easily using commonly available technology, including noncontaminating tubing and appropriate seals which prevent introduction of ambient air. However, in other fabrication technologies, including the prevalent modified chemical vapor deposition process described in U.S. Pat. No. 4,217,027, the glass precursor gases are reacted within a rotating glass tube. Glass, which is formed as a result of ensuing chemistry, is deposited on the inside wall of the tube to ultimately yield an optical fiber preform from which the optical fiber is drawn. In such technologies the glass precursor vapors must be transported from their source to the rotating reaction chamber without permitting the introduction of ambient contaminants. Technologically the most challenging portion of such a gas delivery system involves the region which permits rotation of the reaction tube while adequately sealing the system from ambient environments.

SUMMARY OF THE INVENTION

This invention is a method of forming optical fibers. The method includes delivery of requisite vapors from an appropriate source to a portion of the fiber fabrication apparatus which is rotating relative to the source. The vapors are transported through a seal which permits rotation of a portion of the apparatus while at the same time ensuring the integrity of the glass delivery system from contamination by ambient contaminants. The seal includes a rotating member which is seated at least partially within a relatively stationary member. An appropriate clearance between the rotating member and the stationary member permits rotation of the rotating member within the stationary member. Entry of ambient contaminants into the gas system through this clearance region is prevented by counterflowing noncontaminant gases through the clearance region.

DETAILED DESCRIPTION

The invention is a method of fabricating optical fibers. The invention is addressed to a specific problem which may arise when the practitioner utilizes fiber fabrication processes which involve the transformation of glass precursor vapors to highly pure glasses. A class of such processes involves the reaction of glass precursor vapors within a rotating reaction chamber, as described in U.S. Pat. No. 4,217,027. The rotating reaction chamber may be a rotating glass tube which ultimately becomes at least a structural part of the optical fiber. To ensure the high purity of the glass layers which are formed, a purity which is necessary when low loss fibers of less than 5 dB/km are to be fabricated, gas delivery systems must be used which prevent contamination of the glass precursor vapor stream by ambient air. Sealing the system from ambient air while permitting rotation of a portion of the apparatus lies at the heart of the inventive process.

One particularly troublesome contaminant present in ambient air is water vapor. Constituents of water vapor, when incorporated in an optical fiber, result in high losses at 1.39 microns, and other regions of interest for optical transmission, where OH absorption peaks exist. The effective practice of this invention prevents the introduction of water vapor from ambient air, and hence may result in fibers with additional losses at 1.39 microns due to contamination from ambient water vapor of less than 2dB/km. Both multi-mode and single-mode fibers may be fabricated using this process with advantageous results.

Figure 1:
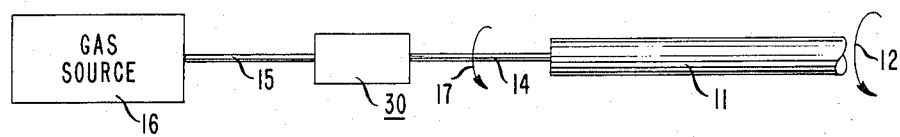
FIG. 1 is a schematic representation of an apparatus for the fabrication of optical fibers using the inventive process.

A typical fiber fabrication process which may make advantageous use of this invention is shown schematically in FIG. 1. In this figure, 16 is a source of appropriate gases including in many embodiments glass precursor vapors. Such gases may include silicon, germanium and phosphorus bearing gases in the form of, for example, silicon tetrachloride, germanium tetrachloride and phosphorus oxychloride. Oxygen may also be included. Additional nonreactive gases which are advantageously used in the fiber fabrication process may also be transported to the reaction chamber, without the introduction of ambient contaminants, using this invention. The gases are transported, for example, by means of appropriate tubing, shown as 14 and 15, to a rotating member 11. In many embodiments the rotating member will be a reaction chamber and, as discussed in U.S. Pat. No.

4,217,027, this chamber may be a glass tube, upon the interior of which glass layers are formed, and which ultimately will form at least a structural part of the resultant optical fiber. In FIG. 1, 11 is shown rotating as a result of an appropriate rotating means 12. A portion of the transport means, 14, used to transport the gases from the gas source 16 to the rotating chamber 11 is also shown rotating by an appropriate means 17. The portion of the rotating tube 14 may, for example, be rigidly attached to the rotating chamber 11. The problem to which this invention is addressed involves the need to provide appropriate vapors to the rotating member while maintaining the system isolated from ambient environments, so that contaminant bearing gases do not enter the system, where they might react and become part of the optical fiber, contributing significantly to its transmission loss characteristics. In an inventive response to this problem, shown in FIG. 1, the rotating portion of the transport means 14 is connected to the stationary portion of the transport means 15 by means of a seal 30. Seal 30 is referred to here as a "rotating seal" and permits section 14 of the transport means to rotate and section 15 to remain stationary, while effectively sealing the gas transport system from the ambient environment, and the contaminants which such ambient environments might introduce into the gas system. Details of the seal are shown in FIGS. 2 and 3 and will be discussed below.

The invention may be advantageously practiced in any fiber fabrication process, especially those which involve the transfer of gases to a rotating member, thereby requiring a rotating seal. FIG. 1 is meant to be representative of a subclass of such processes in which the rotating members are rotating tubes. Such processes involve, for example, the MCVD process described in detail in U.S. Pat. No. 4,217,027, which is hereby incorporated by reference into this application. In that process glass precursor reactant vapors are flowed through a tube and are caused to react in the tube yielding glass layers, perhaps of varying composition from layer to layer, on the interior of the tube. The tube may be collapsed to a solid structure from which a fiber is then drawn. As shown in FIG. 1 the MCVD process is often practiced using a gas delivery system, a portion of which 14, is attached rigidly to the rotating tube 11 and hence rotates with it. The rotating seal 30 then provides a sealed connection between the rotating and stationary portions of the gas transport system.

Figure 3:
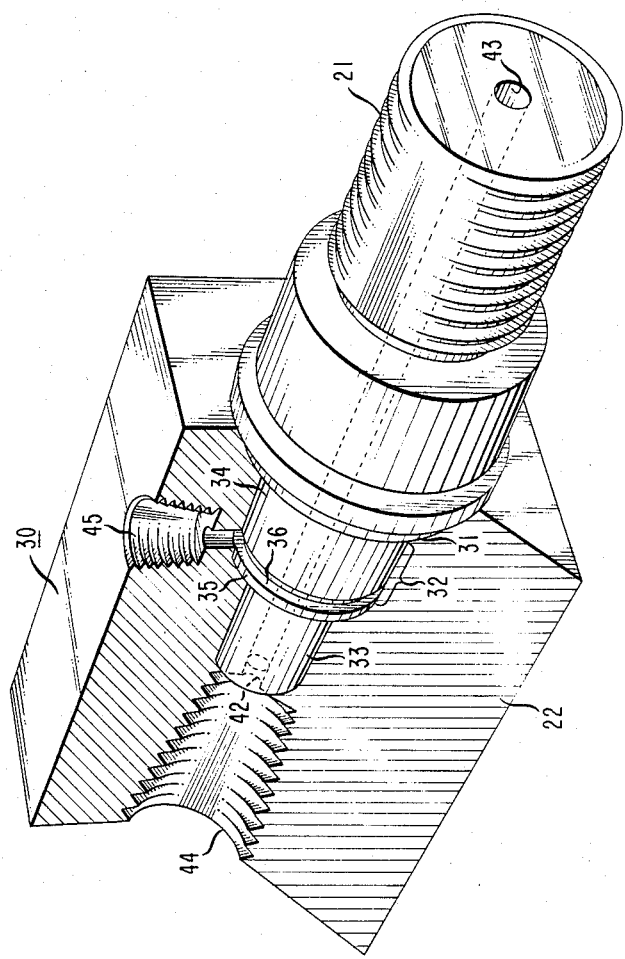

As shown in FIG. 3 the rotating seal comprises a rotating member 21 seated within a nonrotating member 22. An appropriate clearance between the two members permits the one member to rotate within the other. However, the clearance region may likewise permit ambient air, including deleterious contaminants, to enter the flowing gas stream of glass precursor reactant vapors, thereby deleteriously contaminating the system. An element of the invention, therefore, involves counterflowing noncontaminant gases, in some embodiments exemplary reactant gases, such as $SiCl_4$, $GeCl_4$, $POCL_3$ or $O_2$, through the clearance region, thereby preventing the passage of ambient air through the seal into the gas system.

Figure 2:
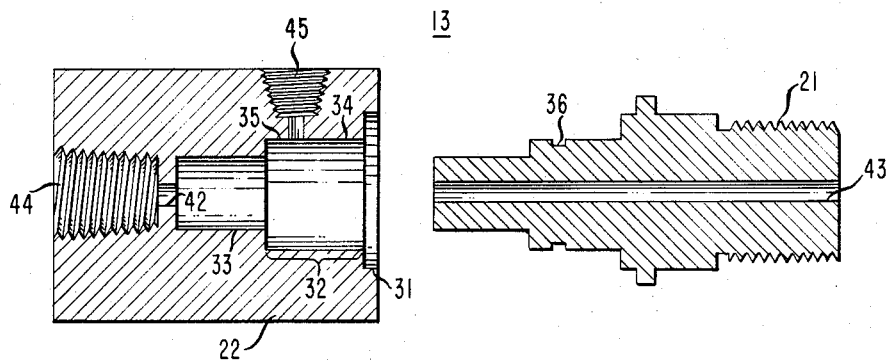
FIGS. 2 and 3 are schematic representations of the rotating seal used in the practice of this invention.

FIGS. 2 and 3 are schematic details of an exemplary seal which may be used in the practice of this invention. In FIG. 2 the rotating portion of the seal 21 and the stationary portion of the seal 22 are shown in detail. In FIG. 3 the rotating member is shown seated within the stationary member, as is the case during actual use.

In FIGS. 2 and 3, 31, 32 and 33 comprise the clearance region, with region 32, comprising regions 34 and 35, being the region of most interest for the purposes of this discussion. The entire clearance region must fit sufficiently loosely so as to permit rotation of 21 when seated within 22. However, while the entire clearance region must be loose fitting as compared, for example, to clearances which would be necessary to provide a gas seal, region 32 is the most loose fitting. Clearances in region 32 will generally be greater than 0.003 inches but less than 0.006 inches, while clearances in other regions will be less than 0.003 inches.

Ambient air with its associated contaminants can clearly enter the clearance region traveling from 31 to 32 to 33, entering the gas stream at 42. To counteract this seepage of ambient air through the clearance region, noncontaminant gases are counterflowed through the region entering, in this exemplary embodiment, at a grooved region 36 and flowing through 34 and 31 to the ambient regions. The flow of these noncontaminant gases, sometimes referred to as flushing gases, prevents passage of ambient air into the gas stream.

The specific seal shown in the figure has a two-part clearance region 32. The upstream portion, 35, relative to the gas flow from 42 to 43, has a narrower clearance than the downstream portion, 34. This further prevents seepage of ambient air into the gas system by encouraging flow of the flushing gas to the ambient via the larger clearance region 34. Additional narrower clearance region 35 further encourages flow of the flushing gas through the relatively wide clearance region 34, thereby preventing entrance of ambient air. The reactant gas input region 44, the flushing gas entry region 45, and the reactant gas exit region 43 need not provide means for relative rotation and hence may be rigidly connected to other parts of the system not shown, such as by means of welds or the illustrated pipe fittings, so as to provide gas tight connection.

In a specific embodiment described in the example, the rotating seal was made of polytetrafluoroethylene (PDFE), a compound available, for instance, under the trade name "Teflon". However, other generally inert materials with low wear characteristics may be used. The rotating and stationary members may be of the same or dissimilar materials, e.g., one of PDFE and one of stainless steel. If the two are of the same high wear material, such as stainless steel, anti-friction bearings, e.g. ball bearings, may be advantageously used.

The stationary member may be compliantly mounted to relieve side forces between the rotating and stationary members associated with, for example, certain types of distortion in the substrate tube.

Having described a specific embodiment for clarity, it is clear that the invention in its broadest sense involves a method of forming an optical fiber where a vapor is transported to a relatively rotating member. Purity of the vapor and prevention of contamination by ambient air is obtained in part by means of a rotating seal, comprising a rotating member seated within a relatively stationary member. Counterflowing noncontaminant gases are flowed through the clearance region to substantially prevent entry of ambient air.

EXAMPLE

In this example very low-loss fiber was fabricated using the MCVD process with equipment shown schematically in FIG. 1. Vapors are pretreated as follows in outline, oxygen carrier gas first passes through a catalytic converter (Centorr Model 2-B) containing 0.5% platinum coated alumina (Engelhard Industries) maintained at about 750 degrees Celsius. This converts all hydrocarbon impurities of the oxygen to form water and carbon dioxide. The gas stream then passes through a molecular sieve (Matheson model 460) which absorbs the gross water, leaving the oxygen with a water content of about 4 ppm.

Next the oxygen travels through stainless steel lines to a refrigerator (FTS Systems model MC8-130-MS) maintained at −80 degrees Celsius or lower. The cold cavity of the refrigerator, filled with 2-methyl butane contains a copper coil packed with dust-free copper chips. The oxygen passes through this coil where most of the remaining water is trapped.

After the refrigerator, a small amount (100 cc/min.) of oxygen is bled off from the main line to a DuPont 303 moisture monitor. The main oxygen stream is then split in order to feed each of the automatic flow controllers (Applied Materials model AFC-550) which regulate the amount of oxygen flowing through each of the bubblers containing the liquid starting materials ($SiCl_4$, $GeCl_4$, and $POCl_3$). Boron trichloride gas is supplied directly from a tank via its own AFC (Matheson model 8265) and monel lines and fittings.

The bubblers, which are temperature regulated by YSI model 72 temperature controllers, are housed in a lucite dry box, along with the delivery lines and electric solenoids (Fluorocarbon-Delta) which direct the gas flows. The delivery lines in the system up to the points where they enter the dry box are made from ¼ inch O.D. 316 stainless steel or monel (for $BCl_3$) tubing, and are joined with 316 stainless steel or monel (for $BCl_3$) Swagelok fittings. All lines inside the dry box leading to and from the bubblers, plus the vent lines and the main delivery line to the glass working lathe are fabricated from ¼ inch O.D. fused quartz tubing. These lines are joined either by fusing or with PDFE Swagelok fittings. The interior parts of the solenoids which come into contact with the reactant flow are also made from PDFE. The dry box is continuously flushed with line nitrogen which has a water content of a few ppm, thus providing a dry atmosphere around the chemical delivery system. The fill ports of the bubblers are connected by silica tubing to PDFE bulkhead fittings in the top of the dry box. This allows refilling of the bubblers without removing them from the dry box. All the tubing and fittings in the system, both steel and PDFE, are wrapped with heating tapes to allow for bakeout to remove adsorbed water from the inside walls. The system was designed with a minimum of unflushed dead space, and all the delivery and vent lines are flushed continuously with dry oxygen.

The system is controlled from a central unit which contains the switches which control the solenoids, the potentiometers and Data-Trak model 73211 device which regulate the AFC's together with their read-outs, a multifunction strip chart recorder (Hewlett Packard model 7100BM), and pyrometer and puffer electronics.

The glass working lathe is a Litton HSJ-U unit with a Litton PSMC 9600 fire carriage traverse-speed controller. Deposition and collapse temperatures are controlled by regulating the hydrogen and oxygen flows to the burner with a Tylan GP 395 automatic flame control system. The lathe is also equipped with a Williamson 4400 optical pyrometer which measures the temperature of the hot zone of the reaction tube during deposition and collapse. Intermittent positive pressure within the tube is also used to maintain tube diameter at high temperatures.

The delivery tube from the reactant supply system is connected to the rotating deposition tube in the lathe by means of the special rotating seal shown in FIG. 2. It is constructed from PDFE and contains no internal O-rings. All connections to it are by means of PDFE Swagelok fittings. The internal seal is PDFE and the rotating seal is flushed with the same pure oxygen as is used to carry the reactants. Tests with a helium leak detector indicated that leakage of ambient atmosphere into the seal was below the detection limit of the leak detector. No reactant leaks out of the seal have been detected.

Optical fiber preforms were fabricated by the MCVD technique using 13.6×16 mm TO-8 WG (Amersil Inc.) and 16×20 mm GE (General Electric Co.) fused quartz tubes. The tubes were cut to length then cleaned by first soaking 10 minutes in isopropyl alcohol followed by 10 minutes deionized water flowing rinse. Next the tubes were etched for 20 minutes with 1:1:1 49% HF:70% $HNO_3$:$H_2O$ solution, followed by 20 minutes deionized water flowing rinse and filtered nitrogen drying. After mounting in the lathe, each tube was fire polished at about 1700 degrees Celsius before deposition.

High purity starting materials were used for all experiments and typically contained about 3 ppm OH, 15 ppm HCl and less than 3 ppm $SiHCl_3$.

The deposition of barrier-cladding and core was carried out at minimum temperatures appropriate to each composition and traverse speed. The pyrometer position was calibrated for traverse speed so that it was centered on the hottest part of the hot zone. The flame temperature was adjusted so that the fusion front within the tube coincided with or was a few mm ahead of this hottest spot.

The barrier-claddings were deposited in the small tubes (13.6×16 mm) in 25 passes using $SiCl_4$, 0.7 g/min.; $POCl_3$, 0.02 g/min.; and $BCl_3$, 4 cc/min., at a temperature of ∼1450 degrees Celsius for the first pass rising gradually to ∼1500 degrees Celsius for the last.

The cores were deposited in 50 passes, using 0.7 g/min. $SiCl_4$. The $POCl_3$ concentration was gradually raised from 0.005 g/min. to 0.02 g/min. over the first five passes, then held constant at 0.02 g/min. for the rest of the core. The $GeCl_4$ rate was graded from 0.02 to 0.28 g/min. over the 50 core passes. Core deposition temperatures were gradually lowered from ∼1600 to 1500 degrees Celsius over the course of the 50 passes. 962 cc/min. excess oxygen was used for all depositions.

Traverse speeds ranging from 12 to 17 cm/min. were used for the barrier-cladding, while cores were deposited at speeds from 17 to 27.5 cm/min. Pressure collapse was carried out in 3 passes at speeds of 5 cm/min. or less and 0.2 inches of water oxygen pressure.

A second series of preforms was prepared using 16×20 mm GE fused quartz tubes. These were cleaned as previously described and fire polished with 5 passes at about 1700 degrees Celsius.

The barrier-claddings were deposited in 20 passes using $SiCl_4$, 1 g/min.; $POCl_3$, 0.004 g/min.; and $BCl_3$, 6 cc/min., at a temperature of 1480 degrees Celsius. The cores were deposited in 50 passes using 1 g/min. $SiCl_4$. The $POCl_3$ concentration was raised gradually from 0.012 to 0.044 g/min. during the first five core passes then held at 0.044 g/min. for the rest of the core. The $GeCl_4$ rate was graded from 0.027 to 0.76 g/min. over the 50 core passes. 962 cc/min. excess oxygen was used for all depositions. The core deposition temperature was gradually reduced from 1620 to 1480 degrees Celsius over the first 20 passes then remained constant. The traverse speed was 17.5 cm/min. through all the depositions.

Collapse was carried out in three passes at speeds of 2 cm/min. or less and oxygen pressures of 0.2–0.3 inches of water.

The small preforms were drawn into ~1000 meter lengths of fiber O.D. 110 μm and core diameter about 45 μm. The barrier-cladding was about 8 μm thick. The fibers were coated in-line during drawing with a 25 μm jacket of silicone resin.

The larger preforms were drawn into 128 μm O.D. fibers with 50 μm cores and 5 μm thick barrier-claddings. They were also coated with 25 μm of silicone resin.

The combination of catalytic furnace, molecular sieve and refrigerator was very effective in reducing the methane and water content of the carrier oxygen. Generally, the contamination level was below the detection limit of our analytical equipment, this being 1 ppm and 50 ppb, respectively for methane and water.

Seven step-index fibers were made prior to the fabrication of the graded index structures, in order to ensure the proper functioning of the new equipment. Following this 5 graded fibers were prepared from 16 mm tubes and 5 from 20 mm tubes.

For the small preform series, the lowest loss at 820 nm was 2.7 dB/km amd at 1300 nm the lowest value was 0.7 dB/km. The lowest OH peak at 1390 nm was 0.6 dB/km above background. The average OH peak was 1.4 dB/km with a standard deviation of ±0.72 dB/km.

For the large preform series, the lowest loss at 820 nm was 3.4 dB/km and at 1300 nm the lowest value was 0.6 dB/km. The lowest OH peak at 1390 nm was 0.5 dB/km above background. The average OH peak was 0.7 with a standard deviation of ±0.25 dB/km.

What is claimed is:

1. A method of forming an optical fiber, the method comprising flowing a first gas comprising glass precursor gas through a seal from a first stationary structure to a second structure rotating relative to the first structure, reacting in the second structure at least some of the glass precursor gas to form a glass, and forming the glass into an optical fiber, the fiber having an added loss at 1.39 microns of less than 2 db/km, the seal comprising a first member essentially rigidly connected to the first structure and a second member essentially rigidly connected to the second structure, the second member seated at least partially within the first member, with a clearance between the first member and the second member, thereby forming a clearance region through which ambient gas could enter to contaminate the first gas, the clearance region comprising a first and a second portion, the first portion being upstream of the second portion, relative to the flow of first gas, the clearance of the first portion being smaller than the clearance of the second portion, the method further comprising counterflowing noncontaminant second gas within the clearance region, whereby contamination of the first gas by the ambient gas can be substantially reduced.

2. The method of claim 1 further comprising forming the glass into an optical fiber having an added loss at 1.39 microns of less than 1.4 dB/km.

3. The method of claim 2 wherein the glass precursor gas comprises gas selected from the class consisting of silicon-containing gases, germanium-containing gases, and phosphorus-containing gases.

4. The method of claim 2 wherein the stationary structure is a gas bearing structure connected to a gas source.

5. The method of claim 4 wherein the second structure is a gas bearing structure connected to a reaction chamber.

6. The method of claim 5 wherein the reactant chamber is a glass tube.

7. The method of claim 6 wherein glass is deposited on the interior of the glass tube by means of the modified chemical vapor deposition process.

8. The method of claims 1 or 7 wherein at least one of the first or second members comprises polytetrafluoroethylene or stainless steel.

9. The method of claims 2 wherein the counterflowing second gas comprises reactant gases.

10. The method of claim 9 wherein the counterflowing gas comprises $SiCl_4$, $GeCl_4$, $POCl_3$ or $O_2$.

* * * * *